Patented Feb. 28, 1939

2,148,763

UNITED STATES PATENT OFFICE 2,148,763

COMPOSITION OF MATTER AND METHOD OF PREPARING SAME

Edward Lyons, Detroit, Mich., assignor to Parke, Davis & Company, Detroit, Mich., a corporation of Michigan No Drawing. Application September 23, 1935, Serial No. 41,829

4 Claims. (Cl. 260—447)

The invention relates to a new bismuth composition and a process for preparing the same. The new composition is of particular value as a therapeutic agent.

It is known that many high molecular weight aliphatic acids containing an oxygen atom substituted on the carbon atom alpha to the carboxyl group yield oil-soluble bismuth salts, several compounds of this type having been introduced into medicine, as for example, bismuth camphorcarbonate. This compound, however, as well as many other analogous products, although oil soluble, does not possess the requisite stability under conditions of prolonged storage which is essential for a commercial product. Still other compounds of this type have proved objectionable from the standpoint of tissue injury following intramuscular injection.

My invention relates to the production of a new bismuth composition which in the preferred embodiment is in the form of a stable salt containing 46 to 48 per cent bismuth. It is soluble in vegetable oils and also esters of organic acids such as benzyl benzoate, and does not cause tissue injury following injection. My new product most probably possesses one of the following formulae:

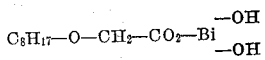

or

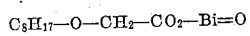

which theoretically contain 48.6 and 50.7 per cent of bismuth respectively. The product is prepared from the oxide of bismuth by reacting the same with octyloxyacetic acid. A specific example of its preparation is given below.

Example 100 grams of octyloxyacetic acid having a boiling point at 20 mm. pressure of mercury of 162° C. is placed in a flask with 63 grams of bismuth oxide ($Bi_2O_3$). The flask is placed into an oil bath and the mixture heated to a temperature of 125° C.–150° C. with stirring for about four hours. Too high temperatures appear to be objectionable. The reaction mixture is filtered directly from any unreacted bismuth oxide and the filtrate is then treated with a solvent such as cold methyl alcohol, in which the unreacted octyloxyacetic acid and impurities are soluble but in which the basic bismuth salt is practically insoluble.

In a modified process the reaction mixture obtained as above is treated with sulphuric ether, filtered, and the ether removed by evaporation. The residue remaining is then treated with methanol or an equivalent solvent for the octyloxyacetic acid and other impurities.

The methanol containing the impurities is then filtered off and the residue dried to give about 55 grams of solid analyzing approximately 46 to 48 per cent bismuth. This solid is suitable for therapeutic use. It is white, tasteless, curd-like, and is slightly waxy in consistency. It decomposes with intumescence when heated. It is odorless or may have a faint ester-like odor if very small amounts of impurities are present.

The product may be dissolved in a suitable solvent such as animal or vegetable oil, e. g. olive oil or peanut oil, or it may be dissolved in an ester, such as benzyl benzoate, or in a mixture of solvents to give non-irritating, non-toxic solutions suitable for injection, especially in the treatment of syphilis.

I have found that a very satisfactory preparation for injection is obtained by dissolving the bismuth compound of the above example in hot olive oil, diluting with benzyl benzoate, and filtering from any small amount of insoluble material to give a clear solution. By this method solutions containing 50 or more milligrams of bismuth per cc. are readily obtained.

The octyloxyacetic acid used in the above example may be obtained from octyl alcohol by the use of sodium and chloroacetic acid as described in British Patent No. 414,121 and United States Patent No. 2,044,968, issued June 23, 1936.

In addition to the above example, I have conducted other experiments aiming at the preparation of my new composition and using modifications of the process described herein, but in each instance have obtained a product analyzing close to the values above given. I, therefore, believe that the product consists not of a normal bismuth salt but of a basic compound corresponding to the formula $C_8H_{17}$—O—$CH_2$—$CO_2$—Bi=O or its hydrate.

What I claim as my invention is:

1. A purified reaction product of octyloxyacetic acid and bismuth oxide suitable for therapeutic use, which in solid form is white and tasteless, which contains about 48 per cent bismuth and which yields stable oil solutions.

2. An oil soluble stable basic bismuth octyloxyacetate containing approximately 48 per cent bismuth and possessing most probably the following formula: $C_8H_{17}$—O—$CH_2$—$CO_2$—Bi=O.

3. A basic bismuth salt of octyloxyacetic acid containing approximately 48% bismuth.

4. The process of obtaining a stable basic bismuth salt which comprises reacting octyloxyacetic acid with bismuth oxide at a temperature above 125° C. and below a temperature which causes decomposition, thereby obtaining a basic bismuth salt containing approximately 48% bismuth.

EDWARD LYONS.